US012560289B2

(12) United States Patent
Lech, Jr.

(10) Patent No.: US 12,560,289 B2
(45) Date of Patent: Feb. 24, 2026

(54) DECORATIVE LIGHTING ASSEMBLY FOR VERTICAL STRUCTURES

(71) Applicant: Stanley J Lech, Jr., Davie, FL (US)

(72) Inventor: Stanley J Lech, Jr., Davie, FL (US)

(*) Notice: Subject to any disclaimer, the term of this patent is extended or adjusted under 35 U.S.C. 154(b) by 0 days.

(21) Appl. No.: 18/445,780

(22) Filed: Jan. 29, 2024

(65) Prior Publication Data

US 2025/0243979 A1 Jul. 31, 2025

(51) Int. Cl.

| | |
|---|---|
| ***F21S 2/00*** | (2016.01) |
| ***F21V 21/08*** | (2006.01) |
| ***F21V 23/06*** | (2006.01) |
| ***F21W 121/04*** | (2006.01) |
| ***F21Y 107/30*** | (2016.01) |

(52) U.S. Cl.

CPC .......... *F21S 2/005* (2013.01); *F21V 21/0832* (2013.01); *F21V 23/06* (2013.01); *F21W 2121/04* (2013.01); *F21Y 2107/30* (2016.08)

(58) Field of Classification Search

CPC ...... F21S 2/005; F21V 21/0832; F21V 23/06; F21Y 2107/30; F21W 2121/04

See application file for complete search history.

(56) References Cited

U.S. PATENT DOCUMENTS 4,852,832 A 8/1989 Delany
5,519,595 A * 5/1996 Wang .................. F21V 33/0028 362/253
5,639,157 A 6/1997 Yeh
5,649,755 A * 7/1997 Rapisarda ................ A43B 3/36 362/108
6,062,701 A 5/2000 Hines
6,224,231 B1 5/2001 Personius
6,402,336 B1 * 6/2002 Reese ........................ F21S 4/10 362/812
6,783,259 B1 * 8/2004 Macedonio ............. G09F 13/04 362/249.17
7,198,383 B2 * 4/2007 Martino .................. G09F 13/22 362/249.06
D876,275 S 2/2020 Huang
10,641,470 B1 * 5/2020 Smyth ................. F21V 21/0816
11,293,605 B1 * 4/2022 Massinello ........... F21V 21/088
(Continued)

FOREIGN PATENT DOCUMENTS

CN 202660493 U * 1/2013

*Primary Examiner* — Mary Ellen Bowman

(74) *Attorney, Agent, or Firm* — Wilkinson Law Office; Clinton H. Wilknson

(57) ABSTRACT

A decorative lighting assembly for vertical structures, e.g. posts and trees, includes: a plurality of stackable grid members, each a semi-flexible sheet having a top, a bottom and at least two sides, having sufficient flexibility to wrap around the vertical structure and having a maximum width of x and having a rigid vertical section of the sheet less than width x, the semi-flexible sheet, each of the grid members having an attachment mechanism at the top and an attachment mechanism at the bottom to vertically connect each of the grid members to one another; at least one decorative lighting member that is selected from being permanently attached to and being removably attached to the grid member, the at least one decorative lighting member having a plurality of decorative lights electrically connected to one another, and having a power source connection for the decorative lights.

20 Claims, 9 Drawing Sheets

(56) References Cited

U.S. PATENT DOCUMENTS

| | | | | |
|---|---|---|---|---|
| 11,723,452 | B2 | 8/2023 | Pengov | |
| 2001/0025393 | A1 | 10/2001 | Nicolette | |
| 2007/0041179 | A1 | 2/2007 | Barthelmess | |
| 2016/0178156 | A1 * | 6/2016 | Magras-Sinnen | F21V 1/22 403/364 |
| 2018/0078070 | A1 * | 3/2018 | Kenny | A47G 33/06 |
| 2020/0208794 | A1 | 7/2020 | Stange | |

* cited by examiner

DECORATIVE LIGHTING ASSEMBLY FOR VERTICAL STRUCTURES

REFERENCE TO RELATED APPLICATIONS

The present application has no related applications.

BACKGROUND OF INVENTION a. Field of Invention

The present invention relates to installation and removal of seasonal decorative lighting as applied to tall vertical structures such as lamp posts, poles, trees and any other such structures to which users may desire to temporarily install decorative lighting. Two such examples are: decorative lights attached to palm trees, coconut trees and other trees with high, extended trunks; and government installed Christmas lighting on Main Street lamp posts. Historically, such installations involve the dangerous use of ladders (leaning against a structure that has a smaller width than the ladder), or expensive and awkward "cherry picker" elevated baskets, or as in the case of one municipality, dangerously driving from lamp post to lamp post with a small ladder on the bed of a pick-up truck to wrap lighting around the post. The present invention objectives include eliminating such dangers and making installation easy from the ground. The present invention involves decorative lighting assemblies that include stackable, semi-flexible grid members that wrap around and glide up vertical structures, and each grid member includes a stiffing section, i.e., a rigid vertical section, to maintain its structural integrity when it has been installed on a post or tree or other vertically elongated structure. The present invention decorative lighting assemblies also include at least one decorative lighting member that is selected from being permanently attached to, and being removably attached to, one or more grid members. Each decorative lighting member has a plurality of decorative lights electrically connected to one another, and has a power source connection to electrically connected decorative lights such as AC, DC, or battery power.

b. Description of Related Art

The following patents are representative of the field pertaining to the present invention:

U.S. Pat. No. 11,723,425 B2 to Pengov describes decorative systems that include an elongated decorative element and associated methods of manufacture and use are described. An example decorative system has a frame and an elongated decorative element attached to the frame. The frame has a first end, a second end, a length, and a main body that defines a slot and a central passageway. The slot provides access to the central passageway. The frame is moveable between a first configuration and a second configuration. The slot has a first width when the frame is in the first configuration and a second width when the frame is in the second configuration. The second width is greater than the first width. The first elongated decorative element has a first end, a second end, and a length. The length of the first elongated decorative element is greater than the length of the frame.

U.S. Pat. No. 10,641,470 B1 to Smyth describes a decorative lighting device and process for mounting method the lighting device on curved or cylindrical surfaces or support structures, such as tree trunks, columns and poles, the lighting device including a system of light strands mounted to at least two brackets at opposite ends of the light strands, and preferably multiple intermediate brackets along the length of the strands between the end brackets, wherein the strands are connected to the brackets by fasteners, such as ties, tie wraps or staples with a first predetermined distance between the fasteners and a second predetermined distance between the light strands, and the brackets are positioned laterally with respect to the strands and spaced apart a third predetermined distance. The brackets may be made of plastic or wood and have predetermined dimensions. The light strands include a plurality of light sources, preferably LED's, that may be a single color or different colors.

U.S. Pat. No. 6,224,231 B1 to Personius describes a festive decorative lighting system for trees which features a collar that encompasses a circular power bus that is connected to a plurality of light strings that protrude through the sides of the collar and radially descend down the sides of the tree to positions remote from the collar. The user places the collar onto the crown of the tree by using a telescopic pole with a hook that reversibly engages a hoop attached to the top of the collar.

U.S. Pat. No. 6,062,701 to Hines describes a telescoping, outdoor, lighted, Christmas tree exhibit, which at night will simulate a lighted Christmas tree. The Christmas tree exhibit comprises a plurality of concentric hoops, populated with Christmas lights. The hoops are each of decreasing diameter that are sequentially interconnected by a plurality of concentric non stretching, flexible plastic bands, each hoop decreasing in size at the same rate as the hoop before it, with the largest-diameter hoop at the bottom of the Christmas tree exhibit and the smallest-diameter hoop at the top of the Christmas tree exhibit, when fully extended, a conical, tree-shaped appearance is obtained. Preceding the uppermost hoop is a top disk that is connected to the top end of the non stretching, flexible plastic bands. The top disk is supported by an adjustable, collapsible center pole. The bottom end of the non stretching, flexible plastic bands are anchored at the bottom of Christmas tree exhibit, so that when the non stretching, flexible plastic bands are fully extended and pulled taut, the hoops of the tree are completely suspended off the ground and the Christmas tree is standing. The tree is light weight and wind resistant. When disassembled, the hoops rest one inside the other, not touching each other, allowing the lights to stay attached to the hoops while in storage and preventing the breakage of bulbs and entangling of lights, resulting in a quick pop-up installation, and quick disassembly with minimal storage space required.

U.S. Pat. No. 5,639,157 to Yeh describes a decorative light string includes a multiplicity of illuminators; a multiplicity of light output transducers, each of the illuminators receiving light from at least one corresponding light output transducer; a wire harness connected to the illuminators, the harness having a principal portion, a multiplicity of feeder members extending from spaced feeder locations on the principal portion to respective illuminators for permitting the illuminators to be located at respective distances from the principal portion, the distances being greater than the spacing between the feeder locations, at least one of the illuminators including a corresponding one of the light output transducers, the corresponding feeder including a pair of conductors extending from the corresponding feeder location of the harness, the pair of conductors being connected to the transducer; and an AC powered control circuit connected to a plurality of circuit paths of the wire harness, the control circuit being capable of sequentially driving the circuit paths for activating corresponding subsets of the light output transducers, the light output transducers of each circuit path being series-connected, adjacent ones of the light output transducers being in different ones of the circuit paths.

U.S. Pat. No. 4,852,832 to Delaney describes a novel decorative light holder which includes means for retaining separate lights and intermediate wiring along straight and curvilinear paths including paths perpendicular to each other; and includes contact adhesive means to permit easy attachment on walls or other structures, such as window frames or adjacent interior or exterior wall structures.

U.S. Design Pat. No. D876,275 S to Huang illustrates a design for a lighted palm tree assembly.

U.S. Patent Application Publication No. 2020/0208794 A1 to Singh describes a banner assembly, for example, a banner assembly having a light-emitting diode (LED) light network arranged in a pattern of a national flag thereby illuminating the national flag for display. The banner assembly herein comprises an LED light network having LED lights arranged in a pattern of a national flag, and a plurality of detachable rods attached to the LED light network by one or more connectors.

U.S. Patent Application Publication No. 2007/0041179 A1 to Barthelmess describes an artificial palm tree assembly for insertion into a table, preferably a patio table, is provided. The artificial palm tree assembly comprises a palm head comprising a crown element and a plurality of tree elements attached to the crown element of the palm head. Each of the tree elements comprises a branch having a plurality of artificial palm tree leaves thereon. In addition, the artificial palm assembly further comprises a trunk element adapted for installation through an opening in the top of the table. The palm head connects to the trunk element via an attachment formed between the bottom area of the crown element and the top end of the trunk element. Moreover, artificial palm assembly preferably further comprises a base portion for providing support for the palm head and the trunk element of the palm tree assembly installed within the patio table.

U.S. Patent Application Publication No. 2001/0025393 A1 to Nicolette describes a decorating and cleaning product which uses a unique latch attachment designed to efficiently hang decorative holiday items such as strings of Xmas Lights in high trees and other places with the use of an 11' foot 3 locking telescopic pole and the screw on latch. This allows for the elimination of a ladder which can be a safety hazard, plus it expands holiday decorating through the use of the pole and latch attachment. Working in sync with the decorative end of the latch, is the open end gutter cleaning brush which depresses into the gutter while pulling the attached rope which at the same time opens the opposite decorative end to pick up small limbs, twigs and other items to discard. The secondary cleaning attachment is designed to screw into the same 11-foot 3 section telescopic pole, which allows for the cleaning of high windows, walls and ceilings. This invention is made of rubber, soft cloth, plastic, wood and fiberglass making it safe, light and flexible and most importantly it does not conduct electrical current, so when using to hang strings of xmas lights, it can be considered electrically shock proof.

Notwithstanding the prior art, the present invention is neither taught nor rendered obvious thereby.

SUMMARY OF INVENTION

The present invention relates to decorative lighting assemblies for vertical structures, such as lampposts, poles and trees, that eliminates the need for ladders, or bucket trucks or other elevating devices and allows users to stack these assemblies to high positions, such as ten, fifteen, twenty feet or more, without leaving ground level. This present invention assembly includes: a) at least one grid member, the grid member being a semi-flexible sheet having a top, a bottom and at least two sides and having a maximum width of x and having a vertical section of the sheet less than width x wherein the vertical section is a rigid vertical section, the semi-flexible sheet having sufficient flexibility to wrap around the vertical structure; and b) at least one decorative lighting member that is selected from being permanently attached to and being removably attached to, the at least one grid member, the at least one decorative lighting member having a plurality of decorative lights electrically connected to one another, and having a power source connection to the electrically connected decorative lights.

In some present invention embodiments, the at least one grid member is at least one semi-flexible sheet selected from the group consisting of a continuous sheet and broken sheet. By "broken" is meant having slots, openings, orifices or cut-outs. In some present invention embodiments, the broken sheet is selected from the group consisting of a mesh, a randomly orificed sheet and a symmetrically orificed sheet.

In some embodiments of the present invention decorative lighting assemblies for vertical structures, the rigid vertical section is an integral section of the sheet that is a unistructurally formed sheet. In some of these embodiments, the integral section is a thicker section and the sheet includes at least one thinner, flexible section. Alternatively, the sheet could be of the same flexible thickness, but have embedded rod or rods or other stiffening component(s). In other embodiments of the present invention decorative lighting assemblies for vertical structures, the rigid vertical section is a separately attached section. This could be glued, heat sealed, sleeved or otherwise attached to a main sheet. In some embodiments, the rigid vertical section is a rigid vertical section selected from the group consisting of an elongated flat piece, a rod, and a spine, or multiples or combinations thereof.

In some preferred embodiments of the present invention decorative lighting assemblies for vertical structures, the at least one grid member is a flat sheet with a plurality of vertically foldable hinges to enable flat storage and to enable flexible wrapping about the vertical structure. This is most preferred as storage in a flat position is most efficient. Typically, there will be multiple section panels with hinge folds in-between.

Further, in the present invention, the at least one grid member includes attachment mechanisms for receiving and holding the at least one decorative lighting member to it. The power source connection in the present invention is for connection to a power sources selected from the group consisting of an AC power source a DC power source and a battery power source.

In alternative embodiments, the decorative lighting assembly for vertical structures, includes a plurality of stackable grid members, each of the grid members being a semi-flexible sheet having a top, a bottom and at least two sides and having a maximum width of x and having a vertical section of the sheet less than width x wherein the vertical section is a rigid vertical section, the semi-flexible sheet having sufficient flexibility to wrap around the vertical structure, each of the grid members having an attachment mechanism at the top and an attachment mechanism at the bottom to vertically connect each of the grid members to one another, as well as the decorative lighting member and all of the other features described above.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

Figure 1:
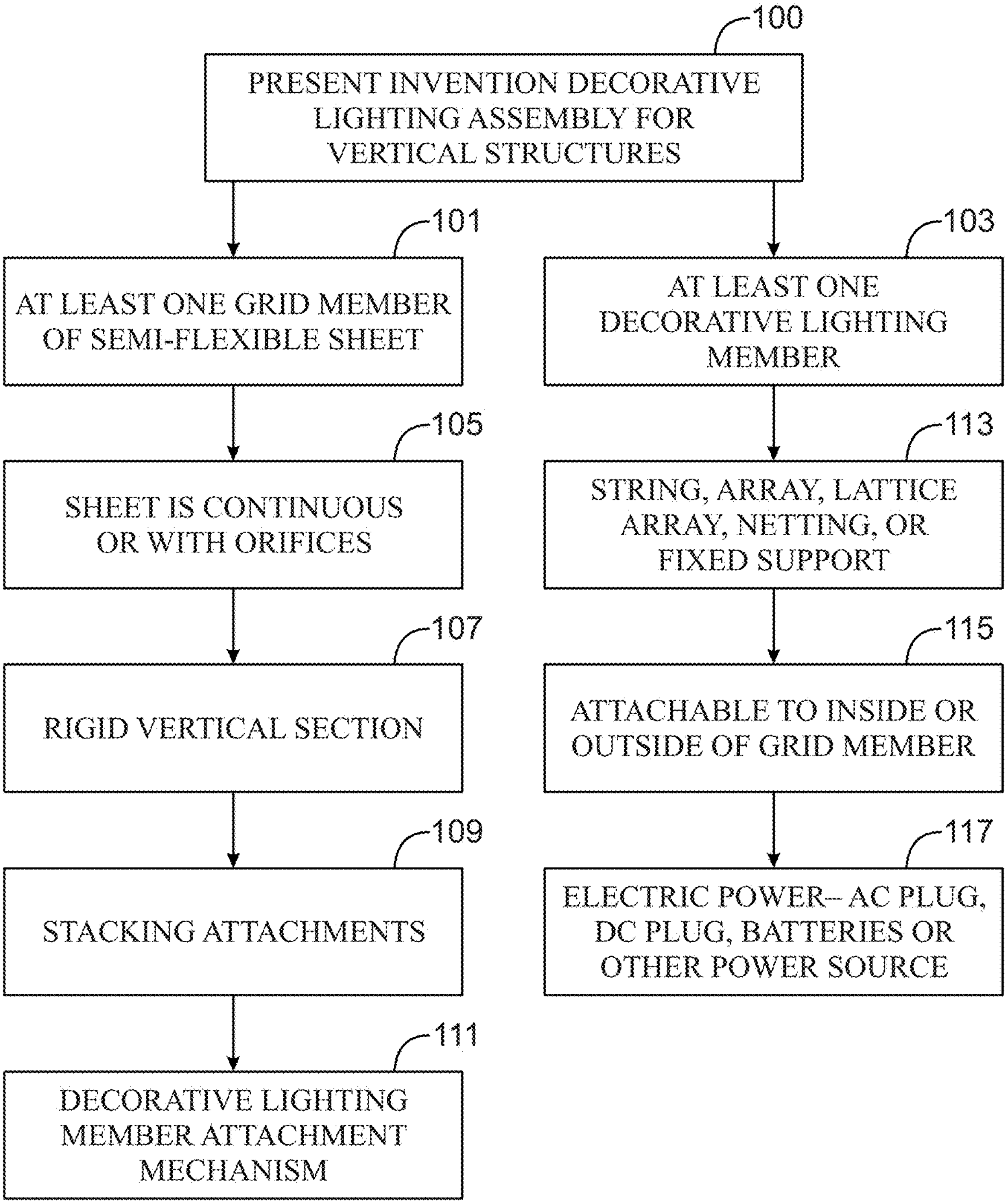
FIG. 1 is a block diagram showing some of the features and options of the present invention decorative light assemblies.

The present invention decorative lighting assembly is beneficially utilized by installing on a vertical structure and stacking two or more assemblies so that they extend upwardly beyond human reach, and are connected to one another in a stacked formation to maintain stacking integrity. Assembly is used herein to reference a combination of a grid member and a lighting member, whereas system is used to mean a plurality of stacked, connected assemblies. Thus, a user will attach the lighting member to the grid member (or it will be purchased already assembled) to create an assembly; the user will then wrap the first assembly around the tree or pole or other vertical structure, assure the assembly is attached to the vertical structure, push up that first assembly and then similarly install a second assembly below the first and attach the two. Where there are plug powering arrangements, the plugs must be plugged in. The process is repeated for a third, fourth, etc. assembly stackings, to achieve the desired height of the lighting without the user having to leave ground level. Thus, the stackable and connectable assemblies create an illumination system that allows one individual to decorate high vertical and elevated surfaces such as trees, poles, and lamp posts without the need of a ladder or lift equipment/aids. The system allows physically fit and physically limited and elderly individuals the ability to decorate surfaces beyond their natural reach and without the need for a ladder, lift equipment such as a bucket lift, cherry picker, boom or elevated platforms.

The system of stackable and connectable decorative light assemblies includes the basic support flexible grid members and the decorative lighting members. The grid member is made of flexible vertical, horizontal, diagonal or otherwise shaped members. The members can vary in structural rigidity to allow bending around surfaces and/or supporting the weight of the system to avoid bowing or collapse. Each grid member may be in a shape that can be easily stored as a flat mat, such as a square or rectangle. This ensures minimum storage space for the system when not in use. The grids are supplied in various heights and lengths so that they can be applied to different size and diameter trees, poles and posts, or be significantly adjustable with lengthy attachment components. In some embodiments, the grids are self-centering on the tree due to flexible spacer blocks that provide a consistent distance from the tree, pole or post and the bend in place grid. In other embodiments, spacers are not used.

When ready to use, each individual grid and light assembly is taken from its storage case. The first assembly can be bent into or otherwise formed or already shaped in a cylindrical or polygonal shape around trees, poles and posts to cover the surface. Upon completing the installation over the surface of the tree (or other vertical structure), the first grid member and lighting assembly is then locked into place to form a self-supporting wrap, such as a cylinder or other footprint shape, capable of accepting and supporting additional grids above or below it. Ideally, the first assembly is put in place around the tree, pole or post and is pushed up vertically. Then a second grid is then placed underneath the first assembly. The first and second assembly are then connected to allow the flow of electricity between each assembly, or in the case of wirelessly controlled battery powered assembly units, electrical connection between assemblies is unnecessary. This stacking process continues until the desired area of the tree, post or pole is covered with illumination, or as a user may otherwise desire. Such a system allows for fast decoration of a vertical structure by one person. The removal process is the reverse operation of installation, with gravity assisting in the process.

Illuminating surfaces such as homes, trees, poles and lamp posts are very popular practices during national and religious holidays. The most popular method used to illuminate vertical and elevated surfaces such as poles, trees and lamp posts are LED and incandescent lights bulbs on a string and/or stretchable meshes with lights. These lights are typically wound around the trees, poles and posts to cover the surfaces. Such operations can take hours to apply the illumination to the surfaces and require a ladder or lift equipment depending upon the height of the surface needing decoration. The mesh lights fit snugly around the tree, pole or post and require ladders and/or lift equipment both to decorate surfaces that are beyond reach and to remove the lighting when done. In addition, these meshes cannot be moved vertically by the application of the second layer below it. Therefore, they lack the "push along", stackable feature of the present invention and do not allow the illumination to gain height as the application process continues. Typically, 6-8 feet is the maximum height that can be reached by an individual without lift aids. Many people and municipalities enjoy decorating their homes, property and towns with lights for various holidays and celebrations. However, cost, dangers of falling, storage of the illumination when not in use, and need to use rental lifts or vehicles with bucket lifts are significant barriers to installing such illuminations. The safety aspect alone cannot be understated as there are approximately 164,000 emergency room visits per year for individuals falling off ladders and ladder falls are associated with approximately 300 deaths per year. The present invention completely eliminates those risks.

The present invention illumination assemblies that are stackable, modular, adjustable, interconnectable and flexible, may contain multiple illumination features such as LED and incandescent lights which can be energized by AC or DC power. These lights exhibit colors of the visible light spectrum and may have the added feature of flashing and blinking beyond the always on lighted setting. The present invention assemblies are self-supporting and allow vertical illumination on trees, poles and posts up to vertical heights of 20, 50 and even 100 vertical feet. These may be sold in packs of multiple assemblies, which may be the same height or varying heights, such as 4 five foot high assemblies or 3 five foot high plus 1 two foot high assemblies per kit. The lighting members may be included or purchased separately. The Illuminated grid is made of materials resistant to cold, heat and moisture, thus being able to operate safely in all climates and bad weather. The illuminated grid system can be customized by the size/diameter of the surface to cover, for instance the diameter of a tree, pole or post. One system can be made up of various sizes to account for irregular diameters such as a palm tree. The grid members may contain a self-centering feature which allows for equidistant positioning around a tree, pole or post. The centering is achieved via flexible extensions on the inside surface of the grid that interfaces with the tree, pole or post. The illuminated grid member may contain an anti-slip down feature to allow the grid to be placed on the tree, pole or post and shifted up without slipping back down. This allows the placement of another grid beneath it without having to hold the upper assembly. The illuminated grids use temporary locking clips or mechanisms to keep the grids in a cylindrical shape during installation.

Referring now in detail to the drawings wherein like reference numerals designate corresponding parts throughout the several views, various embodiments of the present invention are shown. By way of definition, the terms "sheet and "grid" refer to supporting members that stack and hold lighting members in place. The sheet may be flat or not, may have orifices or not and may even be grids such as plastic or metal lattices and links, similar to link fences, without exceeding the scope of "sheets" and "grids".

FIG. 1 is a block diagram showing some of the features and options of the present invention decorative light assemblies. Block 100 sets out the invention; blocks 101 and 103 define the two primary components of present invention assemblies—at least one grid member of semi-flexible sheet; and at least one decorative lighting member. Referring to more details shown below block 101, block 105 indicates that the sheet may be continuous (no orifices) or with orifices (which may be symmetrical or non-symmetrical), and block 107 indicates that there is a rigid vertical section (to aid in stacking and to avoid flopping or disconnecting from the vertical structure to which it will be attached). Block 109 shows stacking attachments. These are located at the bottom or the top or both bottom and top of the grid members so that the stacked grid members may be attached to one another. In some embodiments, the side ends also have attachment mechanisms to connect an assembly to itself (to keep it tightly positioned around the vertical structure, e.g., an elongated tree trunk). As shown in block 111, there is a decorative lighting member attachment mechanism on the grid member for attaching the lighting member. This could simply be orifices into which bulb holders and bulbs are inserted (as in FIGS. 5, 6 and 7 below) or snaps, or open loops for pass-through, or Velcro strips (aka loops and hooks), tea cup hooks or any other known attachment mechanisms. As lighting is common and on the market in strips, strings and netting, it is preferred to have these attachments on the grid members. However, they may instead, or in addition, be on the lighting members, without exceeding the scope of the present invention. On the right side of FIG. 1, below block 103 are additional features of the lighting members. Block 113 indicates that the lighting member may be a string of lights, a lattice array, netting, or lights on a fixed support. Block 115 indicates that the lighting member may be attached to the inside or the outside of the grid member. If on the inside, then the grim member must have orifices or be transparent or translucent, at least in part for the lights to show through. Block 117 indicates possible power sources for the lighting member.

Figure 2:
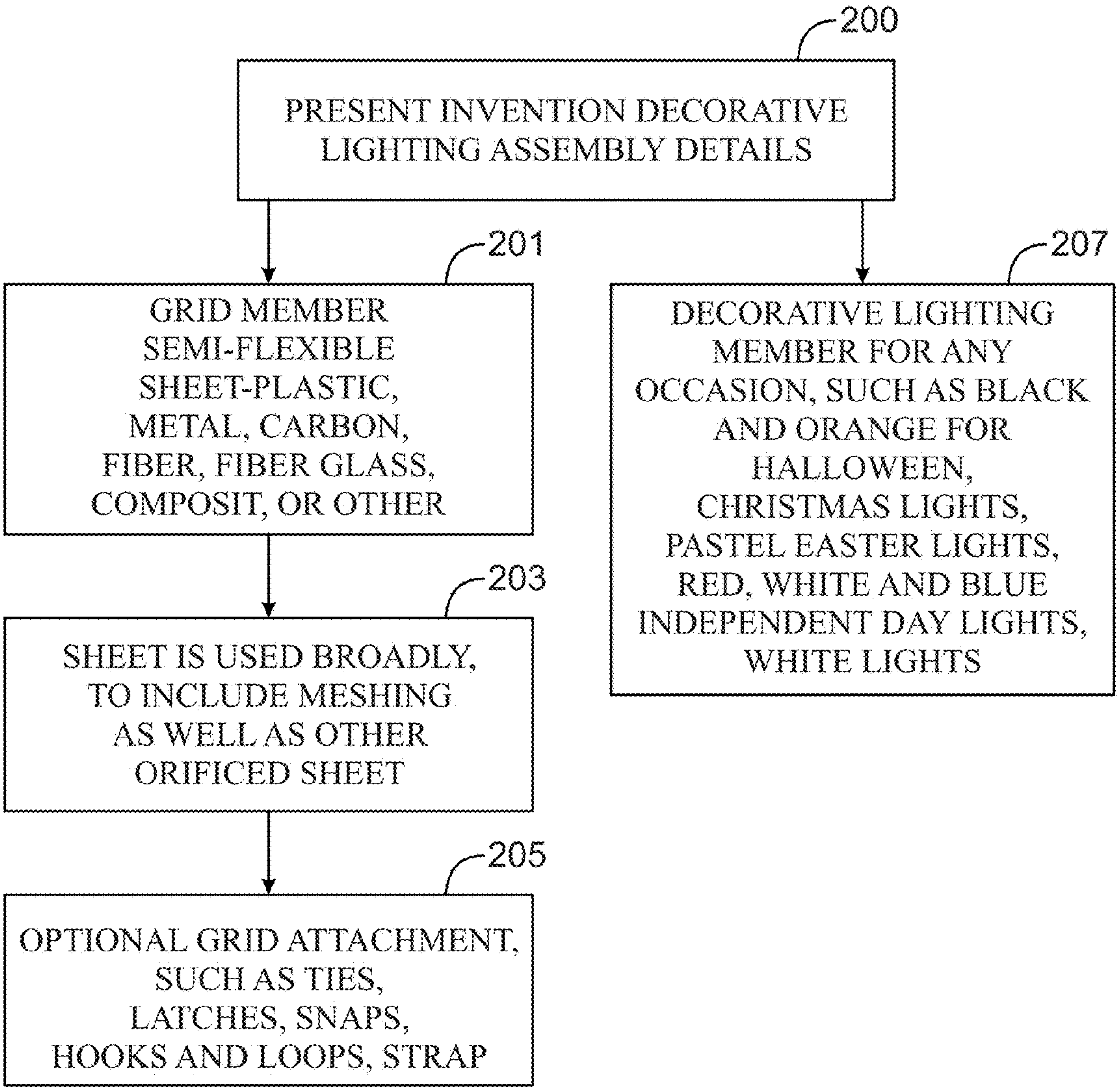
FIG. 2 illustrates another block diagram showing more details of the present invention decorative light assemblies.

FIG. 2 illustrates another block diagram showing more details of the present invention decorative light assemblies, block 200. Block 201 indicates the various materials that may be used to create the grid members; block 203 supports a broad interpretation of the word "sheet" and block 205 illustrates examples of attachments used to attach a grid member to another grid member in stacking as well as to itself for secure closure about a vertical structure (tree, for example). Block 207 indicates that the lighting member may be customized for any occasion.

Figure 3:
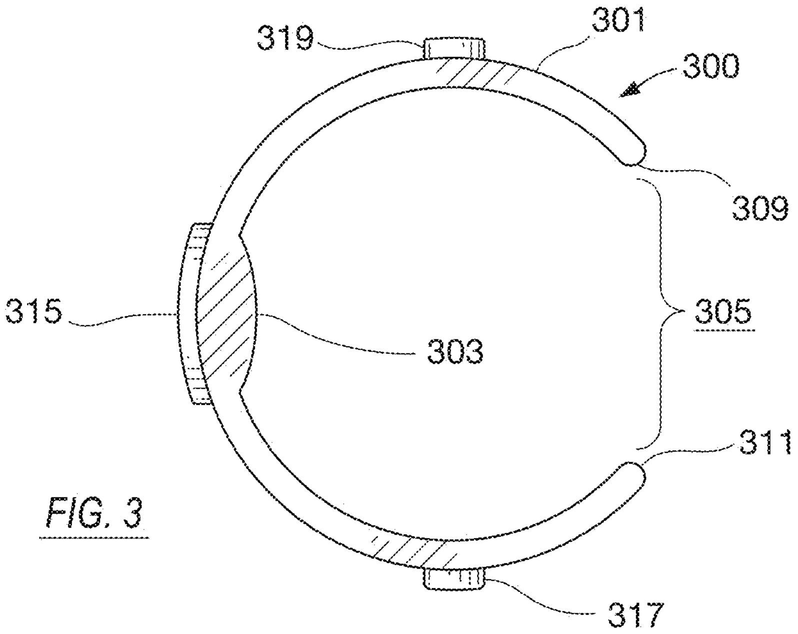
FIG. 3 shows a top view of the grid member of the present invention in which the vertical rigid section is a unistructurally formed grid member.
Figure 4:
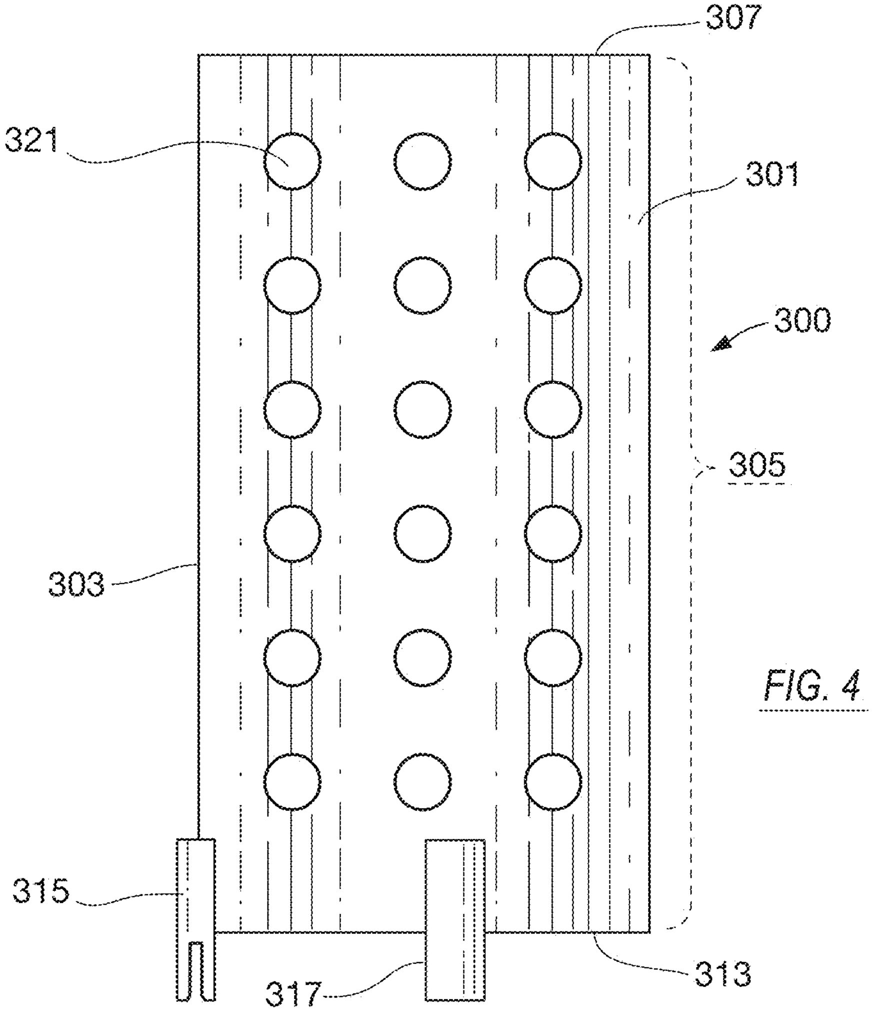
FIG. 4 shows a side view of the grid member of the present invention shown in FIG. 3.

FIG. 3 shows a top view of the grid member 300 of the present invention, and FIG. 4 shows a side view of the same grid member 300. Both Figures are now discussed concurrently. Grid member 300 has a vertical rigid section 303 that is unistructurally formed as part of grid member open flexible loop 301, made of plastic material (such as PVC, polyethylene-propylene blend), fiber glass, carbon fiber or otherwise, with opening 305, and stacking attachments 315, 317 and 319. The loop ends (side walls) are shown as ends 309 and 311. The top is shown as top 307 and the bottom is bottom 313. This grid member 300 has a plurality of orifices, such as orifice 321, which may be used to pass connectors therethrough for lighting attachment, but are more readily used for inside light mounting, with the lights snapped into the orifices so as to protrude to the outside, for beautiful decorative occasion lighting. Attachment mechanisms, i.e., stacking attachments 315, 317 and 319 have clothespin-like slits for assembly interconnection.

Figure 5:
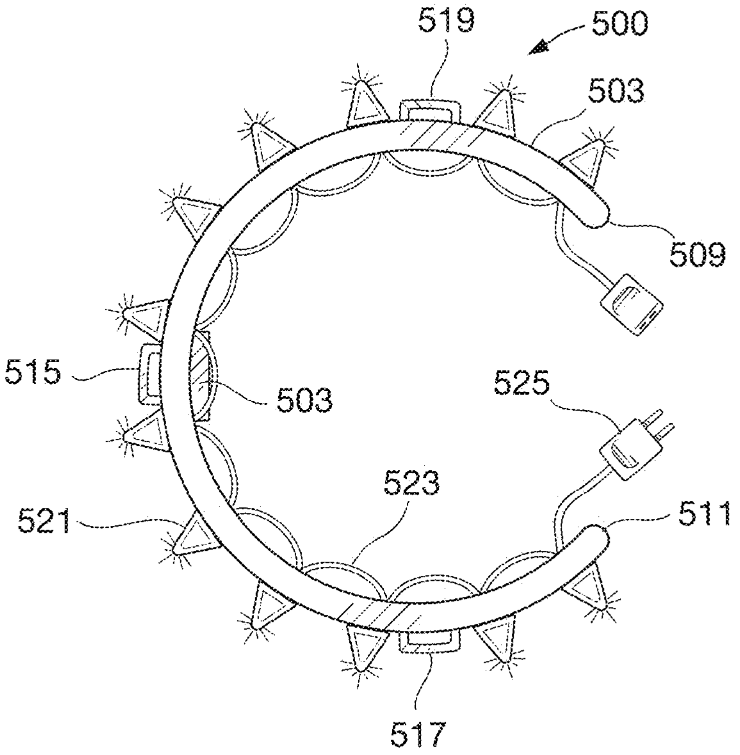
FIG. 5 shows a top view of the present invention assembly with the grid member similar to that shown in FIGS. 3 and 4 and including a decorative lighting member that is mounted from the inside.

FIG. 5 shows a top view of the present invention assembly with the grid member 500 similar to that shown in FIGS. 3 and 4, but with a separate attached vertical stiffening board 503 and including a decorative lighting member 523 that is mounted to grid member 500 from the inside. Grid member 500 has a natural "living spring" C-shaped footprint that can be spread open at ends 509 and 511 and then released to "spring" back to its original position, around a tree or post.

Figure 6:
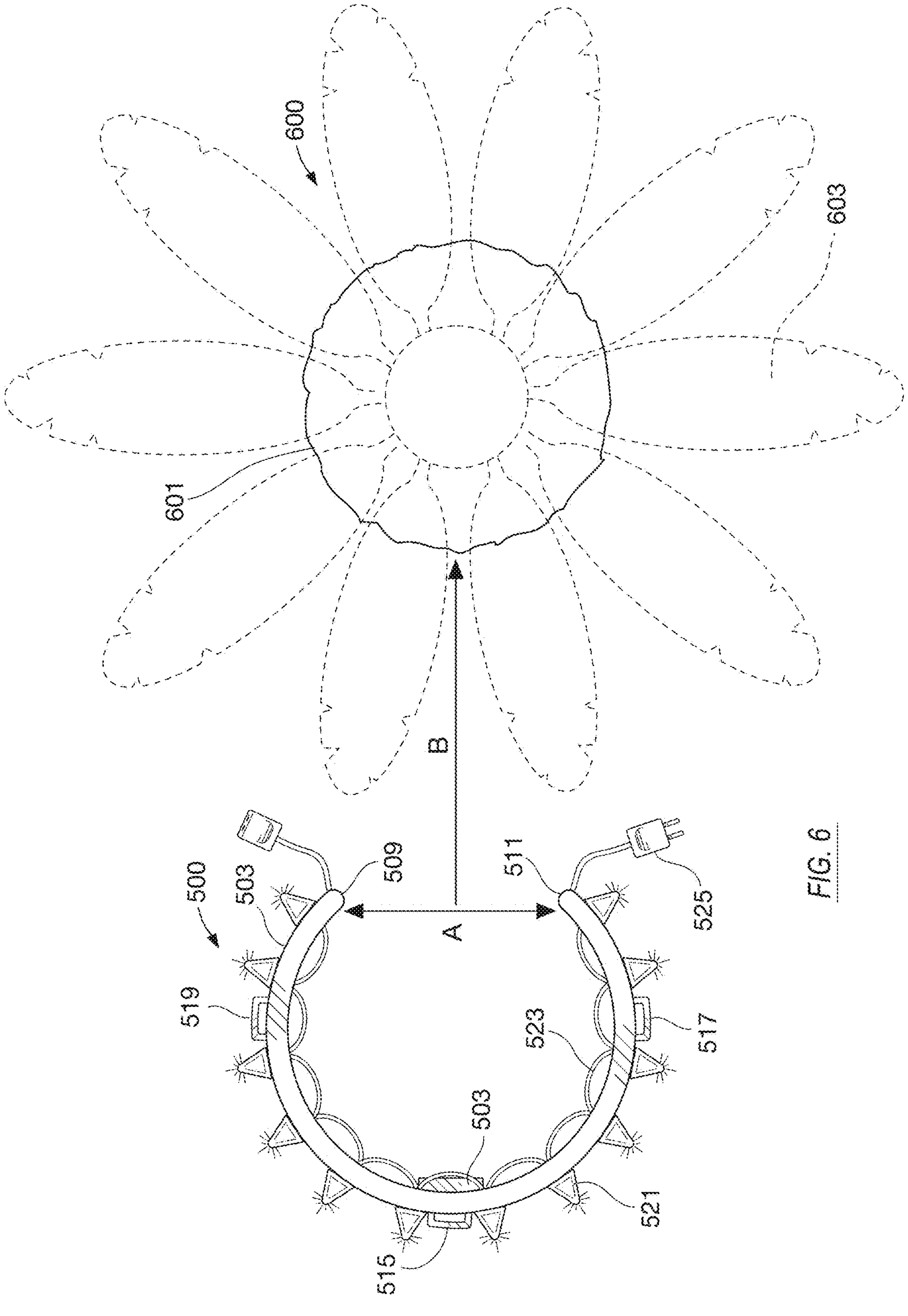
FIG. 6 shows a top view of the assembly shown in FIG. 5, but with open ends spread to wrap around the palm tree shown in this Figure.
Figure 7:
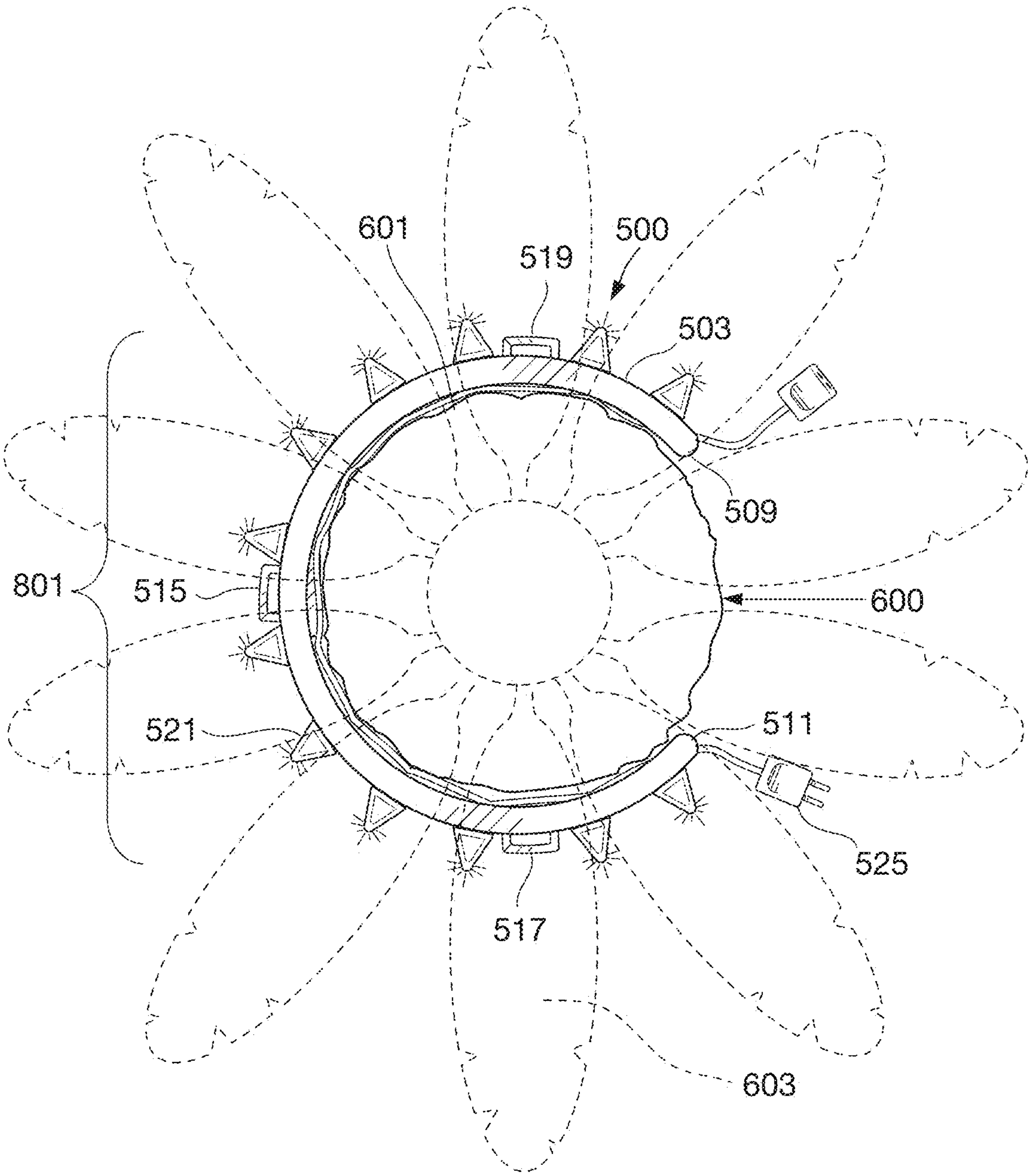
FIG. 7 shows a top view of the assembly shown in FIGS. 5 and 6, now fully attached to the palm tree.
Figure 8:
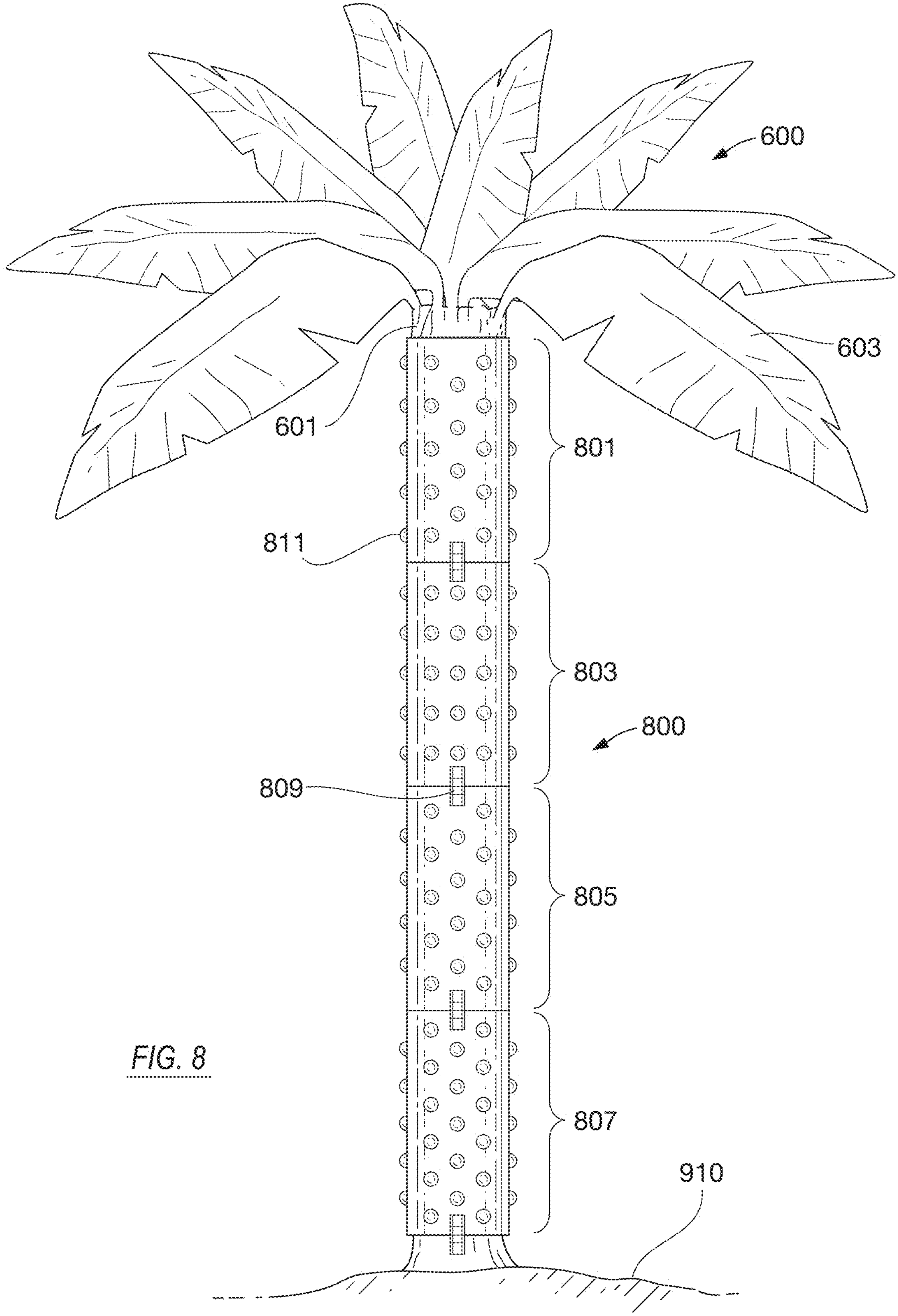
FIG. 8 shows a side view thereof, with four different assemblies stack upon each other and connected to each other.

It is a complete single assembly and the grid member 500 includes attachment clips 515, 517 and 519. The lighting member 523 here is a string of Christmas lights with bulbs and bulb receivers, such as bulb 521, passing through the orifices of grid member 500. These strings have male and female connecting plugs, such as plug 525 for powering the lights. FIG. 6 shows a top view of the assembly shown in FIG. 5, but with open ends 509 and 511 spread to wrap around the palm tree 600 (with very tall trunk 601 and palm leaves such as 603, shown in this Figure. The ends are spread open along the path of line A and then while open, assembly 801 is moved onto tree 600 and the ends are released. FIG. 7 shows a top view of assembly 801 shown in FIGS. 5 and 6, now fully attached to the palm tree 600, and FIG. 8 shows a side view thereof, with four different assemblies stacked upon each other and connected to each other. Here, palm tree 600 has assembly 801 positioned at the top, and below it is connected to assembly 803. Assembly 803 is in turn, connected below to assembly 805. Likewise, assembly 805 is connected below to assembly 807. These four assemblies connected create system 800. Assuming each assembly is 5 feet tall, the user has safely achieved a twenty-foot tall, secured installation without leaving the ground, using the stacking methods described above.

Figure 9:
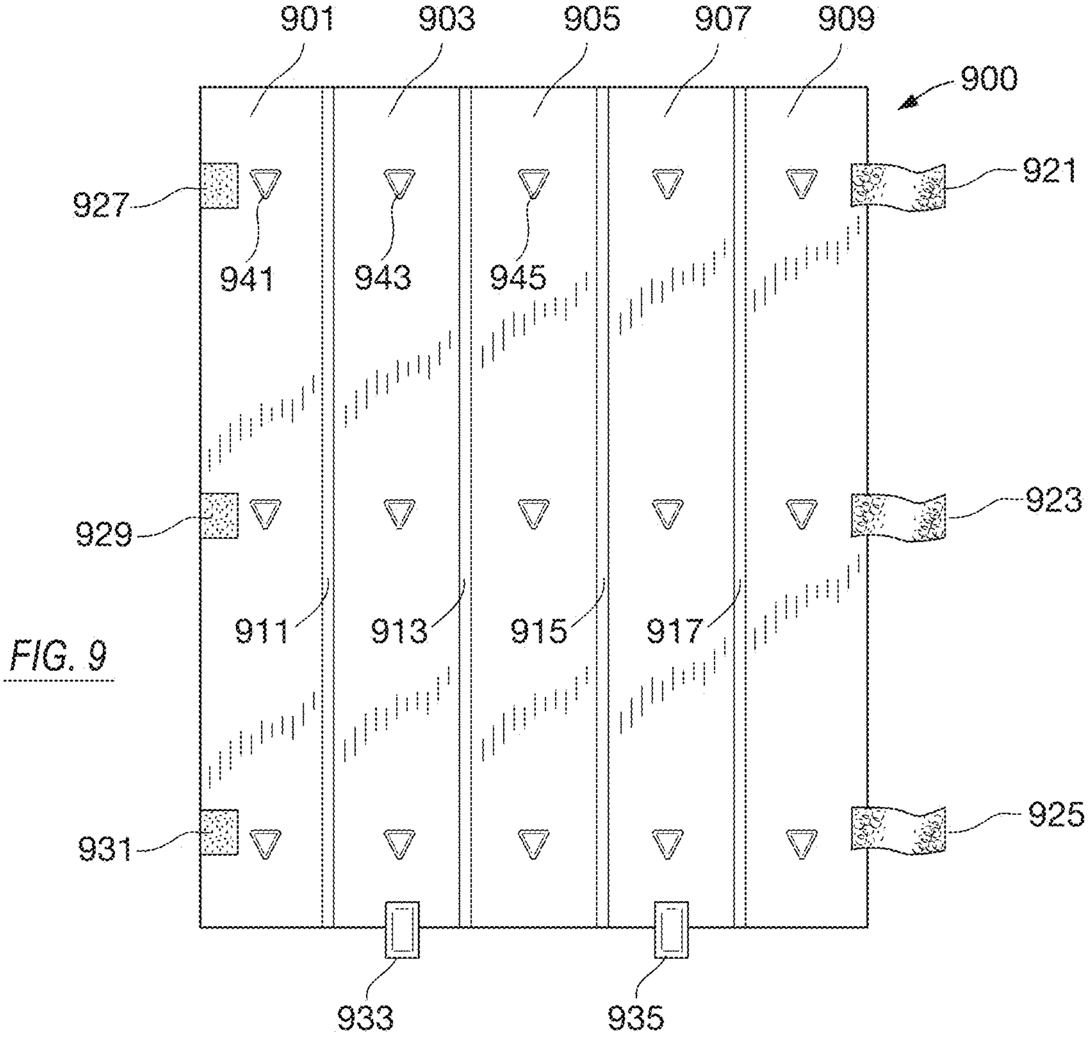
FIG. 9 shows a side view of an alternative present invention assembly grid member with multiple thick sections and thin hinge sections for flat storage and for wrapping around a vertical structure.
Figure 10:
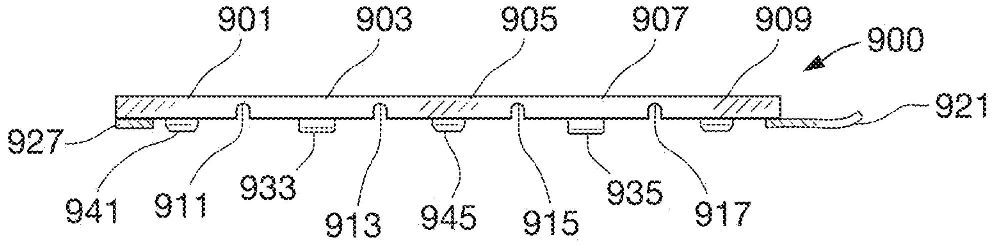
FIG. 10 shows a top view of the present invention decorative light assembly grid member shown in FIG. 9.

FIGS. 9, 10, 11 and 12 are now discussed collectively. FIG. 9 shows a side view of an alternative present invention assembly grid member 900 with multiple thick sections 901, 903, 905, 907 and 909, and thin hinge sections 911, 913, 915 and 917, for flat storage and for wrapping around a vertical structure. There are also self-connecting hook and loop connectors 921, 923, 925, 927, 929 and 931, as well as bottom clips 933 and 935 for attachment to a below positioned similar grid member. There are multiple light fixture member hooks 941, 943, and 945?0 for attachment to the grid member 900. FIG. 10 shows a top view of the present invention decorative light assembly grid member 900 shown in FIG. 9.

Figure 11:
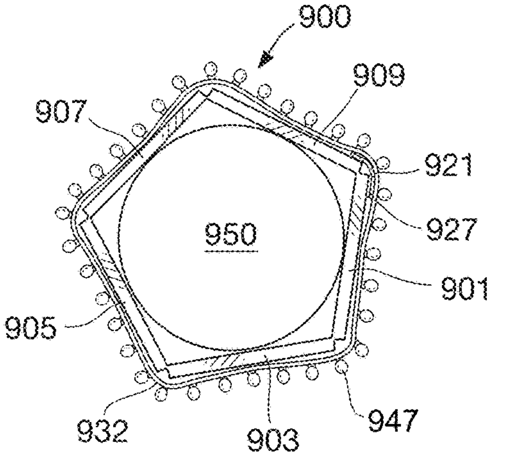
FIG. 11 shows a top view of a present invention decorative light assembly that includes the grid member of FIGS. 9 and 10 and now including an externally attached lighting member.
Figure 12:
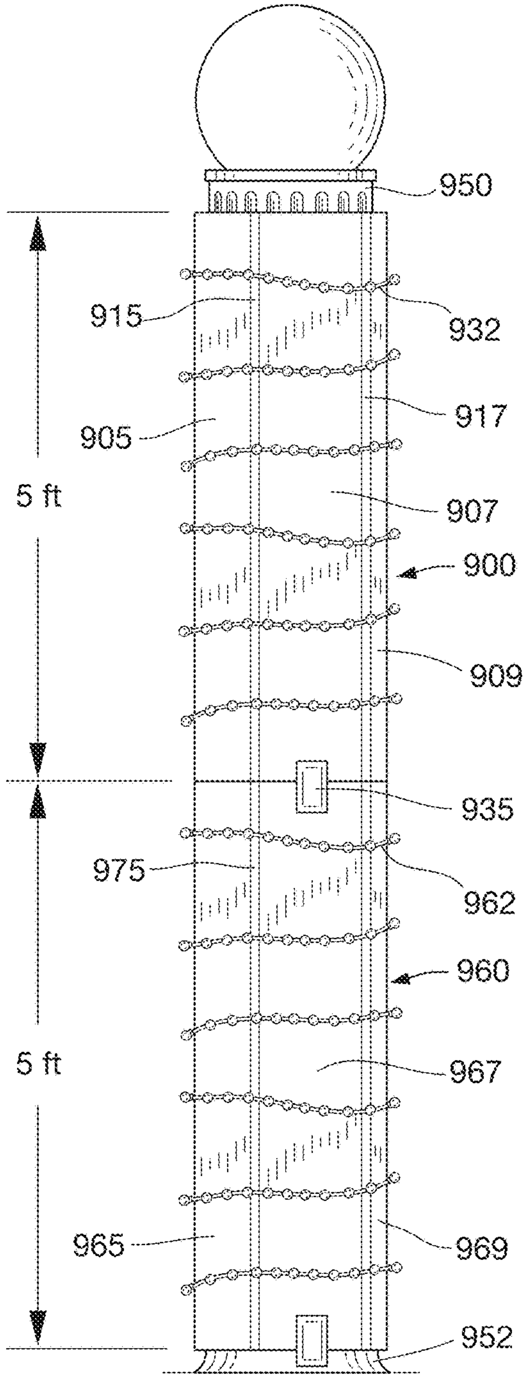
FIG. 12 shows that assembly attached to a lamp post with a second, stacked present invention decorative light assembly.

FIG. 11 shows a top view of a present invention decorative light assembly that includes the grid member 900 of FIGS. 9 and 10 and now includes externally attached lighting member 932 with lights, such as light 947. FIG. 12 shows that assembly attached to the upper section of lamp post 950, with lamp post base 952 that is flared and acts as a bottom stop for the assemblies. There is a second, stacked present invention decorative light assembly below the grid member 900 that includes grid member 960 and thick section panels 965, 967 and 969, with thin vertical hinge folds, such as fold 975, there between. Grid member 960 has lighting string 962 attached thereto.

Although particular embodiments of the invention have been described in detail herein with reference to the accompanying drawings, it is to be understood that the invention is not limited to those particular embodiments, and that various changes and modifications may be affected therein by one skilled in the art without departing from the scope or spirit of the invention as defined in the appended claims. Although particular embodiments of the invention have been described in detail herein with reference to the accompanying drawings, it is to be understood that the invention is not limited to those particular embodiments, and that various changes and modifications may be affected therein by one skilled in the art without departing from the scope or spirit of the invention as defined in the appended claims.

What is claimed is:

1. A decorative lighting system for vertical structures, such as lampposts, poles and trees, which comprises:

a) a plurality of stackable and connectable decorative lighting assemblies, each of said decorative lighting assemblies including a grid member and at least one decorative lighting member supported on the grid member, each grid member being a semi-flexible sheet having a top, a bottom and at least two sides and having a maximum width of x and having a vertical section of said sheet less than width x wherein said vertical section is a rigid vertical section, and having an attachment mechanism at said top and an attachment mechanism at said bottom to vertically connect two or more of said grid members to one another, said semi-flexible sheet having sufficient flexibility to wrap around said vertical structure and having sufficient structural rigidity to allow bending around surfaces and to support a weight of the lighting system without bowing or collapse;

b) the at least one decorative lighting member supported on the grid member selected from being permanently attached to and being removably attached to said grid member, said at least one decorative lighting member having a plurality of decorative lights electrically connected to one another, and having a power source connection to said electrically connected decorative lights.

2. The decorative lighting system of claim 1 wherein each of said plurality of grid members is a semi-flexible sheet selected from the group consisting of a continuous sheet and broken sheet.

3. The decorative lighting system of claim 2 wherein said broken sheet is selected from the group consisting of a mesh, a randomly orificed sheet and a symmetrically orificed sheet.

4. The decorative lighting system of claim 1 wherein said rigid vertical section is an integral section of said sheet that is a unistructurally formed sheet.

5. The decorative lighting system of claim 1 wherein said rigid vertical section is a separately attached section.

6. The decorative lighting system of claim 4 wherein said integral section is a thicker section and said sheet includes at least one thinner, flexible section.

7. The decorative lighting system of claim 5 wherein said rigid vertical section is a rigid vertical section selected from the group consisting of an elongated flat piece, a rod, and a spine.

8. The decorative lighting system of claim 1 wherein each of said grid members is a flat sheet with a plurality of vertically foldable hinges to enable flat storage and to enable flexible wrapping about said vertical structure.

9. The decorative lighting system of claim 1 wherein said at least one grid member includes attachment mechanisms for receiving and holding said at least one decorative lighting member to it.

10. The decorative lighting system of claim 1 wherein each of said grid members has a natural living spring C-shaped footprint that can be spread open and then released to spring back to its original position around a vertical structure.

11. A system of stackable and connectable decorative light assemblies for a vertical structure such as lampposts, poles and trees, each light assembly comprising:

a) a grid member being a semi-flexible sheet having a top, a bottom, side ends, a maximum width of x, a rigid vertical section of said sheet having a width less than the said maximum width x, and an attachment mechanism at the top and another attachment mechanism at the bottom for vertically connecting two or more of said decorative light assemblies to one another in a stacked arrangement, said semi-flexible sheet having a structural rigidity configured to allow placement around said vertical structure and for supporting a weight of the two or more stacked decorative light assemblies of the system to avoid bowing or collapse; and b) at least one decorative lighting member selected from being permanently attached to and being removably attached to, said grid member, said at least one decorative lighting member having a plurality of decorative lights electrically connected to one another, and having a power source connection to said electrically connected decorative lights.

12. The system of claim 11 wherein said at least one grid member is at least one semi-flexible sheet selected from the group consisting of a continuous sheet and broken sheet, and wherein said broken sheet is selected from the group consisting of a mesh, a randomly orificed sheet and a symmetrically orificed sheet.

13. The system of claim 11 wherein said rigid vertical section is an integral section of said sheet that is a unistructurally formed sheet.

14. The system of claim 11 wherein said rigid vertical section is a separately attached section.

15. The system of claim 14 wherein said integral section is a thicker section and said sheet includes at least one thinner, flexible section.

16. The system of claim 14 wherein said rigid vertical section is a rigid vertical section selected from the group consisting of an elongated flat piece, a rod, and a spine.

17. The system of claim 11 wherein said at least one grid member is a flat sheet with a plurality of vertically foldable hinges to enable flat storage and to enable flexible wrapping about said vertical structure.

18. The system of claim 11 wherein said grid member has a natural living spring C-shaped footprint that can be spread open and then released to spring back to its original position around said vertical structure.

19. The system of claim 11 wherein said grid member includes attachment mechanisms for receiving and holding said at least one decorative lighting member to it.

20. The system of claim 11 wherein the grid member further comprises attachment mechanisms on the side ends to connect the side ends to keep the grid member tightly positioned around the vertical structure.

* * * * *